(12) United States Patent
Papasakellariou et al.

(10) Patent No.: US 10,200,979 B2
(45) Date of Patent: *Feb. 5, 2019

(54) MULTIPLEXING CONTROL AND DATA INFORMATION FROM A USER EQUIPMENT IN A PHYSICAL DATA CHANNEL

(71) Applicant: Samsung Electronics Co., Ltd., Gyeonggi-do (KR)

(72) Inventors: Aris Papasakellariou, Houston, TX (US); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 517 days.

This patent is subject to a terminal disclaimer.

(21) Appl. No.: 14/305,699

(22) Filed: Jun. 16, 2014

(65) Prior Publication Data

US 2014/0293932 A1 Oct. 2, 2014

Related U.S. Application Data

(63) Continuation of application No. 13/053,859, filed on Mar. 22, 2011.
(Continued)

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0031* (2013.01); *H04L 1/0073* (2013.01);
(Continued)

(58) Field of Classification Search
None
See application file for complete search history.

(56) References Cited

U.S. PATENT DOCUMENTS 7,013,143 B2 3/2006 Love et al.
7,414,989 B2 8/2008 Kuchibhotla et al.
(Continued)

FOREIGN PATENT DOCUMENTS

CN 101478379 7/2009
CN 101594211 12/2009
(Continued)

OTHER PUBLICATIONS

3GPP TSG RAN WG1, Dresden, Germany, Jun. 28-Jul. 2, 2010 (3pg).
(Continued)

*Primary Examiner* — Mohammad S Adhami
(74) *Attorney, Agent, or Firm* — The Farrell Law Firm, P.C.

(57) ABSTRACT

Methods and apparatus are described for transmitting and receiving HARQ-ACK information in a Physical Uplink Shared CHannel (PUSCH). A method of receiving includes configuring a plurality of cells for a user equipment (UE), where each of the plurality of cells is associated with one transmission mode; receiving, from the UE, via a physical uplink shared channel (PUSCH), encoded concatenated HARQ-ACK bits for the plurality of cells; and decoding encoded concatenated HARQ-ACK bits. HARQ-ACK bits for the plurality of cells are concatenated based on an order of a cell index for each of the plurality of cells, and the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block.

16 Claims, 11 Drawing Sheets

Related U.S. Application Data

(60) Provisional application No. 61/316,134, filed on Mar. 22, 2010, provisional application No. 61/352,164, filed on Jun. 7, 2010, provisional application No. 61/352,623, filed on Jun. 8, 2010.

(51) Int. Cl.
*H04L 1/18* (2006.01)
*H04L 5/00* (2006.01)
*H04W 72/12* (2009.01)
*H04L 1/08* (2006.01)

(52) U.S. Cl.
CPC .......... *H04L 1/1861* (2013.01); *H04L 1/1864* (2013.01); *H04L 5/0053* (2013.01); *H04L 5/0055* (2013.01); *H04W 72/1263* (2013.01); *H04L 1/08* (2013.01); *H04W 72/1205* (2013.01)

(56) References Cited

U.S. PATENT DOCUMENTS

| | | | |
|---|---|---|---|
| 2005/0201325 | A1 | 9/2005 | Kang et al. |
| 2009/0129461 | A1 | 5/2009 | Sundararajan et al. |
| 2009/0241004 | A1 | 9/2009 | Ahn et al. |
| 2009/0245284 | A1* | 10/2009 | Xu et al. .................. 370/474 |
| 2010/0027489 | A1 | 2/2010 | Matsuzawa et al. |
| 2010/0232373 | A1* | 9/2010 | Nory ................ H04W 72/1289 370/329 |
| 2010/0238886 | A1 | 9/2010 | Sambhwani et al. |
| 2011/0051824 | A1 | 3/2011 | Kim et al. |
| 2011/0126071 | A1 | 5/2011 | Han et al. |
| 2011/0141928 | A1 | 6/2011 | Shin et al. |
| 2011/0243066 | A1 | 10/2011 | Nayeb Nazar et al. |
| 2011/0249578 | A1* | 10/2011 | Nayeb Nazar et al. ...... 370/252 |
| 2012/0008585 | A1* | 1/2012 | Kwon ................ H04L 1/1614 370/329 |
| 2012/0057545 | A1 | 3/2012 | Hariharan et al. |
| 2012/0269137 | A1 | 10/2012 | Kang et al. |
| 2012/0320805 | A1* | 12/2012 | Yang et al. .................. 370/280 |
| 2013/0010690 | A1* | 1/2013 | Cheng ................ H04L 1/007 370/328 |
| 2013/0077514 | A1* | 3/2013 | Dinan .......................... 370/252 |
| 2013/0121289 | A1 | 5/2013 | Terry et al. |
| 2013/0153298 | A1* | 6/2013 | Pietraski et al. ................ 175/45 |
| 2014/0043955 | A1 | 2/2014 | Ko et al. |
| 2015/0098433 | A1 | 4/2015 | Papasakellariou et al. |

FOREIGN PATENT DOCUMENTS

| | | |
|---|---|---|
| JP | 2009-525699 | 7/2009 |
| JP | 2010-041312 | 2/2010 |
| JP | 2013-516937 | 5/2013 |
| KR | 1020090085548 | 8/2009 |
| RU | 2 340 105 | 11/2008 |
| RU | 2 378 764 | 1/2010 |
| WO | WO 2009/142436 | 11/2009 |

OTHER PUBLICATIONS

Panasonic: "MAC to Physical Layer Mapping and Control Signaling for Carrier Aggregation", 3GPP TS-RAN WG1 Meeting #55, R1-084222, Nov. 10, 2008.
ZTE: "ACK/NACK Design for LTE-Advanced", TSG-RAN WG1 #58bis, R1-093821, Oct. 12, 2009.
Panasonic: "UL ACK/NACK Transmission on PUCCH for Carrier Aggregation", 3GPP TSG-RAN WG1 Meeting #58bis, R1-093942, Oct. 12, 2009.
Motorola, "Control and Data Multiplexing on PUSCH", R1-081296,3GPP TSG RAN WG1 #52bis, Mar. 27, 2008.
Texas Instruments, "Consideration on Data and Control Multiplexing on PUSCH", R1-080710, 3GPP TSG RAN WG1 #52, Feb. 6, 2008.
Samsung, "Multiplexing Control and Data in the PUSCH", R1-081223, 3GPP TSG RAN WG1 #51bis, Mar. 26, 2008.
ZTE, "Uplink Control Channel Design for LTE-Advanced", R1-092464, TSG-RAN WG1 #57bis, Jun. 23, 2009.
Huawei, "MCS Offset Between Data and Control Signaling on PUSCH", R1-082357, 3GPP TSG RAN WG1 Meeting #53b, Jun. 28, 2008.
CATT, "UL ACK/NACK Transmission Design in FDD with CA", R1-100876, 3GPP TSG RAN WG1 Meeting #60, Feb. 22-26, 2010.
Nokia Siemens Networks, "Control Signalling on PUSCH: Numerical Values for the Offset-Parameter", R1-082594, 3GPP TSG RAN WG1 Meeting #53bis, Jun. 30-Jul. 4, 2008.
Samsung, "UL ACK/NAK Transmission in LTE-A", R1-094083, 3GPP TSG RAN WG1 #58bis, Oct. 12-16, 2009.
Huawei, "LTE-A PDCCH Blind Decoding", R1-101048, 3GPP TSG RAN WG1 Meeting #60, Feb. 22-26, 2010.
Ericsson, "Remaining Issues on Transmission of ACK/NAK on PUSCH for LTE TDD", R1-083740, Sep. 29-Oct. 3, 2008, 7 pages.
Ericsson, Design Considerations for 4-Carrier HSDPA, R1-094055, 3GPP TSG RAN WG1 Meeting #58bis, Oct. 12-16, 2009, 5 pages.
Japanese Office Action dated Nov. 30, 2015 issued in counterpart application No. 2015-047957, 9 pages.
ZTE, "HS-DPCCH HARQ-ACK Design for 4C-HSDPA", R1-100510, 3GPP TSG RAN WG1 Meeting #59bis, Jan. 18-22, 2010, 24 pages.
Japanese Office Action dated Jul. 15, 2016 issued in counterpart application No. 2015-047957, 10 pages.
Chinese Office Action dated Jan. 3, 2017 issued in counterpart application No. 201410323419.0, 9 pages.
Indian Examination Report dated Sep. 27, 2018 issued in counterpart application No. 2591/KOLNP/2012, 5 pages.

\* cited by examiner

MULTIPLEXING CONTROL AND DATA INFORMATION FROM A USER EQUIPMENT IN A PHYSICAL DATA CHANNEL

PRIORITY

The present application is a Continuation of U.S. Ser. No. 13/053,859, which was filed in the United States Patent and Trademark Office (USPTO) on Mar. 22, 2011, and claims priority under 35 U.S.C. § 119(e) to U.S. Provisional Application Nos. 61/316,134, 61/352,164, and 61/352,623, which were filed in the USPTO on Mar. 22, 2010, Jun. 7, 2010, and Jun. 8, 2010, respectively, the entire disclosure of each of which is incorporated herein by reference.

BACKGROUND OF THE INVENTION

1. Field of the Invention

The present invention is directed generally to wireless communication systems and, more specifically, to the transmission of control information signals in an uplink of a communication system.

2. Description of the Art

A communication system includes a DownLink (DL) that conveys transmission signals from a Base Station (BS or Node B) to User Equipments (UEs), and an UpLink (UL) that conveys transmission signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other equivalent terminology.

More specifically, the UL supports the transmission of data signals carrying information content, control signals providing information associated with the transmission of data signals in the DL, and Reference Signals (RSs), which are commonly referred to as pilot signals. The DL also supports the transmission of data signals, control signals, and RSs.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys Uplink Control Information (UCI) through a Physical Uplink Control CHannel (PUCCH). However, when there is a PUSCH transmission, the UE may convey UCI together with data information through the PUSCH.

DL control signals may be broadcast or sent in a UE-specific nature. Accordingly, UE-specific control channels can be used, among other purposes, to provide UEs with Scheduling Assignments (SAs) for PDSCH reception (DL SAs) or PUSCH transmission (UL SAs). The SAs are transmitted from the Node B to respective UEs using Downlink Control Information (DCI) formats through respective Physical Downlink Control CHannels (PDCCHs).

The UCI includes ACKnowledgment (ACK) information associated with the use of a Hybrid Automatic Repeat reQuest (HARQ) process. The HARQ-ACK information is sent in response to the reception of Transport Blocks (TBs) by the UE, conveyed by the PDSCH.

The UCI may also include a Channel Quality Indicator (CQI), a Precoding Matrix Indicator (PMI), or a Rank Indicator (RI), which may be jointly referred to as Channel State Information (CSI). The CQI provides the Node B with a measure of the Signal to Interference and Noise Ratio (SINR) the UE experiences over sub-bands or over the whole operating DL BandWidth (BW). This measure is typically in the form of the highest Modulation and Coding Scheme (MCS) for which a predetermined BLock Error Rate (BLER) can be achieved for the transmission of TBs. The MCS represents the product of the modulation order (number of data bits per modulation symbol) and of the coding rate applied to the transmission of data information. The PMI/RI informs the Node B how to combine the signal transmission to the UE from multiple Node B antennas using a Multiple-Input Multiple-Output (MIMO) principle.

FIG. 1 illustrates a conventional PUSCH transmission structure.

Referring to FIG. 1, for simplicity, the Transmission Time Interval (TTI) is one sub-frame 110, which includes two slots. Each slot 120 includes $N_{symb}^{UL}$ symbols used for the transmission of data signals, UCI signals, or RSs. Each symbol 130 includes a Cyclic Prefix (CP) to mitigate interference due to channel propagation effects. The PUSCH transmission in one slot 120 may be either at a same or different BW as the PUSCH transmission in the other slot.

Some symbols in each slot are used to a transmit RS 140, which enables channel estimation and coherent demodulation of the received data and/or UCI signals.

The transmission BW includes frequency resource units that will be referred to herein as Physical Resource Blocks (PRBs). Each PRB includes $N_{sc}^{RB}$ sub-carriers, or Resource Elements (REs), and a UE is allocated $M_{PUSCH}$ PRBs 150 for a total of $M_{sc}^{PUSCH}=M_{PUSCH} \cdot N_{sc}^{RB}$ REs for the PUSCH transmission BW.

The last sub-frame symbol is used for transmitting a Sounding RS (SRS) 160 from one or more UEs. The SRS provides the Node B with a CQI estimate for the UL channel medium for the respective UE. The SRS transmission parameters are semi-statically configured by the Node B to each UE through higher layer signaling such as, for example, Radio Resource Control (RRC) signaling.

In FIG. 1, the number of sub-frame symbols available for data transmission is $N_{symb}^{PUSCH}=2 \cdot (N_{symb}^{UL}-1)-N_{SRS}$, where $N_{SRS}=1$ if the last sub-frame symbol is used for SRS transmission and $N_{SRS}=0$ otherwise.

FIG. 2 illustrates a conventional transmitter for transmitting data, CSI, and HARQ-ACK signals in a PUSCH.

Referring to FIG. 2, coded CSI bits 205 and coded data bits 210 are multiplexed by multiplexer 220. HARQ-ACK bits are then inserted by puncturing data bits and/or CSI bits by puncturing unit 230. The Discrete Fourier Transform (DFT) is then performed by the DFT unit 240. REs are then selected by sub-carrier mapping by the sub-carrier mapping unit 250 corresponding to the PUSCH transmission BW from controller 255. Inverse Fast Fourier Transform (IFFT) is performed by an IFFT unit 260, CP insertion is performed by a CP insertion unit 270, and time windowing is performed by filter 280, thereby generating a transmitted signal 290.

The PUSCH transmission is assumed to be over clusters of contiguous REs in accordance to the DFT Spread Orthogonal Frequency Division Multiple Access (DFT-S-OFDMA) method for signal transmission over one cluster 295A (also known as Single-Carrier Frequency Division Multiple Access (SC-FDMA)), or over multiple non-contiguous clusters 295B.

FIG. 3 illustrates a conventional receiver for receiving a transmission signal as illustrated in FIG. 2.

Referring to FIG. 3, an antenna receives a Radio-Frequency (RF) analog signal and after further processing units (such as filters, amplifiers, frequency down-converters, and analog-to-digital converters) which are not shown for brevity, the received digital signal 310 is filtered by filter 320 and the CP is removed by CP removal unit 330. Subsequently, the receiver unit applies a Fast Fourier Transform (FFT) by an FFT unit 340, selects the REs used by the transmitter by sub-carrier de-mapping by a sub-carrier demapping unit 350 under a control of controller 355. Thereafter, an Inverse DFT (IDFT) unit 360 applies IDFT, an extraction unit 370 extracts the HARQ-ACK bits, and a de-multiplexing unit 380 demultiplexes the data bits 390 and CSI bits 395.

The RS transmission is assumed to be through a Constant Amplitude Zero Auto-Correlation (CAZAC) sequence. An example of CAZAC sequences is shown in Equation (1).

$$c_k(n) = \exp\left[\frac{j2\pi k}{L}\left(n + n\frac{n+1}{2}\right)\right] \quad (1)$$

In Equation (1), L is a length of the CAZAC sequence, n is an index of an element of the sequence $n=\{0, 1, \ldots, L-1\}$, and k is an index of the sequence. If L is a prime integer, there are L−1 distinct sequences defined as k ranges in $\{0, 1, \ldots, L-1\}$.

For an even number of REs, CAZAC-based sequences with even length can be generated, e.g., by truncating or extending a CAZAC sequence.

Orthogonal multiplexing of CAZAC sequences can be achieved by applying different Cyclic Shifts (CSs) to the same CAZAC sequence.

For HARQ-ACK or RI transmission in the PUSCH, a UE determines the respective number of coded symbols Q' as shown in Equation (2).

$$Q' = \min\left(\left\lceil \frac{O \cdot \beta_{offset}^{PUSCH}}{Q_m \cdot R}\right\rceil, 4 \cdot M_{sc}^{PUSCH}\right) \quad (2)$$

In Equation (2), O is a number of HARQ-ACK information bits or RI information bits, $\beta_{offset}^{PUSCH}$ is informed to the UE through RRC signaling, $Q_m$ is a number of data bits per modulation symbol ($Q_m=2,4,6$ for QPSK, QAM16, QAM64, respectively), R is a data code rate of an initial PUSCH transmission for the same TB, $M_{sc}^{PUSCH}$ is a PUSCH transmission BW in a current sub-frame, and ⌈ ⌉ indicates a ceiling operation that rounds a number to its next integer.

The data code rate R is defined as shown in Equation (3).

$$R = \left(\sum_{r=0}^{C-1} K_r\right) / \left(Q_m \cdot M_{sc}^{PUSCH-initial} \cdot N_{symb}^{PUSCH-initial}\right) \quad (3)$$

In Equation (3), C is a total number of data code blocks and $K_r$ is a number of bits for data code block number r. The maximum number of HARQ-ACK or RI REs is limited to the REs of 4 DFT-S-OFDM symbols ($4 \cdot M_{sc}^{PUSCH}$).

When the UE receives one TB, the HARQ-ACK includes 1 bit that is encoded as a binary '1', if the TB is correctly received (positive acknowledgement or ACK), or as a binary '0', if the TB is incorrectly received (negative acknowledgment or NACK).

When the UE receives two TBs, the HARQ-ACK includes 2 bits $[o_0^{ACK} o_1^{ACK}]$ with $o_0^{ACK}$ for TB 0 and $o_1^{ACK}$ for TB 1. The encoding for the HARQ-ACK bits is given in Table 1 below, where $o_2^{ACK}=(o_0^{ACK}+o_1^{ACK}) \bmod 2$ to provide a (3, 2) simplex code for the 2-bit HARQ-ACK transmission.

TABLE 1

| | Encoding for 1-bit and 2-bits of HARQ-ACK | |
|---|---|---|
| $Q_m$ | Encoded HARQ-ACK - 1 bit | Encoded HARQ-ACK - 2 bits |
| 2 | $[o_0^{ACK} y]$ | $[o_0^{ACK} o_1^{ACK} o_2^{ACK} o_0^{ACK} o_1^{ACK} o_2^{ACK}]$ |
| 4 | $[o_0^{ACK} y\ x\ x]$ | $[o_0^{ACK} o_1^{ACK} x\ x\ o_2^{ACK} o_0^{ACK} o_1^{ACK} x\ x\ o_2^{ACK} x\ x]$ |
| 6 | $[o_0^{ACK} y\ x\ x\ x\ x]$ | $[o_0^{ACK} o_1^{ACK} x\ x\ x\ x\ o_2^{ACK} o_0^{ACK} o_1^{ACK} x\ x\ x\ x\ o_2^{ACK} x\ x\ x\ x]$ |

For CQI/PMI multiplexing in a PUSCH, a UE determines a respective number of coded symbols Q' as shown in Equation (4).

$$Q' = \min\left(\left\lceil \frac{(O+L) \cdot \beta_{offset}^{PUSCH}}{Q_m \cdot R}\right\rceil, M_{sc}^{PUSCH} \cdot N_{symb}^{PUSCH} - \frac{Q_{RI}}{Q_m}\right) \quad (4)$$

In Equation (4), O is a number of CQI/PMI information bits, L is a number of CRC bits given by $$L = \begin{cases} 0 & O \leq 11 \\ 8 & \text{otherwise} \end{cases},$$

and $Q_{CQI}=Q_m \cdot Q'$. If RI is not transmitted, then $Q_{RI}=0$.

For CQI/PMI channel coding, convolutional coding is used, if O>11 bits, and (32, O) Reed-Mueller (RM) block coding is used, if O≤11 bits. The code words of the (32, O) block code are a linear combination of the 11 basis sequences denoted by $M_{i,n}$ and given in Table 2 below. Denoting the input sequence by $O_0, o_1, o_2, \ldots, o_{O-1}$ and the encoded CQI/PMI block by $b_0, b_1, b_2, b_3, \ldots, b_{B-1}$, B=32, it is $$b_i = \sum_{n=0}^{O-1} (o_n \cdot M_{i,n}) \bmod 2,$$

i=0, 1, 2, ..., B−1.

The output sequence $q_0, q_1, q_2, q_3, \ldots, q_{Q_{CQI}-1}$ is obtained by circular repetition of the encoded CQI/PMI block as $q_i=b_{(i \bmod B)}$, i=0, 1, 2, ..., $Q_{CQI}-1$.

TABLE 2

Basis sequences for (32, O) code.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 1 | 0 | 1 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Among the UCI, HARQ-ACK has the highest reliability requirements and the respective REs are located next to the RS in each slot in order to obtain the most accurate channel estimate for their demodulation. When there is no CQI/PMI transmission, RI is placed at the symbols after the HARQ-ACK, while CQI/PMI transmission is uniformly multiplexed throughout the sub-frame.

FIG. 4 illustrates conventional UCI multiplexing in a PUSCH sub-frame.

Referring to FIG. 4, the HARQ-ACK bits 410 are placed next to the RS 420 in each slot of the PUSCH sub-frame. The CQI/PMI bits 430 are multiplexed across all DFT-S-OFDM symbols and the remaining of the sub-frame carries transmission of data bits 440. As the multiplexing is prior to the DFT, a virtual frequency dimension is used for the UCI placement.

For a UE transmitter having more than one antenna, Transmission Diversity (TxD) can enhance the reliability of the received signal by providing spatial diversity.

An example TxD method is Space Time Block Coding (STBC). With STBC, if the first antenna transmits the symbols $d_0, d_1$, the second antenna transmits the symbols $d^*_1, -d^*_0$, where $d^*$ is the complex conjugate of d. Denoting the channel estimate for the signal received at a reference Node B antenna and transmitted from the $j^{th}$ UE antenna by $h_j$, $j=1,2$, and denoting the signal received at the Node B antenna in the $k^{th}$ DFT-S-OFDM symbol by $y_k$, $k=1,2$, the decision for a pair of STBC symbols $[\hat{d}_k, \hat{d}_{k+1}]$ is according to $[\hat{d}_k, \hat{d}^*_{k+1}]^T = H^H [y_k, y^*_{k+1}]^T$, where $[]^T$ denotes the transpose of a vector and $$H^H = \begin{bmatrix} h^*_1 & -h_2 \\ h^*_2 & h_1 \end{bmatrix} \bigg/ (|h_1|^2 + |h_2|^2).$$

In order to increase the supportable data rates, aggregation of multiple Component Carriers (CCs) is considered in both the DL and the UL to provide higher operating BWs. For example, to support communication over 60 MHz, aggregation of three 20 MHz CCs can be used.

FIG. 5 illustrates the concept of conventional Carrier Aggregation (CA).

Referring to FIG. 5, an operating DL BW of 60 MHz 510 is constructed by the aggregation of 3 (contiguous, for simplicity) DL CCs 521, 522, and 523, each having a BW of 20 MHz. Similarly, an operating UL BW of 60 MHz 530 is constructed by the aggregation of 3 UL CCs 541, 542, and 543, each having a BW of 20 MHz. For simplicity, in the example illustrated in FIG. 5, each of DL CCs 521, 522, and 523 is assumed to be uniquely mapped to a UL CC (symmetric CA), but it is also possible for more than 1 DL CC to be mapped to a single UL CC or for more than 1 UL CC to be mapped to a single DL CC (asymmetric CA, not shown for brevity). The link between DL CCs and UL CCs is typically UE-specific.

The Node B configures CCs to a UE using RRC signaling. Assuming transmission of different TBs in each of the multiple DL CCs 521, 522, and 523, multiple HARQ-ACK bits will be transmitted in the UL.

For simultaneous HARQ-ACK and PUSCH transmissions, the direct extension of the conventional operation is to include the HARQ-ACK bits for the TBs received in a DL CC in the PUSCH of its linked UL CC. However, in practice, not all UL CCs may have PUSCH transmissions in the same sub-frame. Therefore, any design supporting transmission in the PUSCH of HARQ-ACK bits corresponding to reception of TBs in multiple DL CCs should consider the case of only a single PUSCH. This also applies for any UCI type (not just HARQ-ACK). The PUCCH transmission is assumed to be in a single UL CC, which will be referred to as UL Primary CC.

TxD should be supported for UCI transmission in the PUSCH (if the UE has multiple transmitter antennas), particularly for the HARQ-ACK that requires high reliability that may be difficult to achieve without substantially increasing the required PUSCH resources particularly for large HARQ-ACK payloads (such as, for example, 10 HARQ-ACK bits corresponding to reception of TBs in 5 DL CCs with 2 TBs per DL CC).

Therefore, there is a need to support transmission of HARQ-ACK information in the PUSCH in response to the reception of at least one TB from a UE configured with CA in the DL of a communication system.

There is another need to dimension the PUSCH resources used for HARQ-ACK multiplexing depending on the HARQ-ACK coding method in order to improve the HARQ-ACK reception reliability.

There is another need to select the PUSCH for the transmission of UCI, for multiple simultaneous PUSCH transmissions.

There is another need to support TxD for the HARQ-ACK transmission in the PUSCH.

SUMMARY OF THE INVENTION

Accordingly, the present invention has been designed to solve at least the aforementioned limitations and problems in the prior art.

An aspect of the present invention is to provide methods and apparatus for a UE to transmit ACK signals associated with a HARQ process, i.e., HARQ-ACK signals, in response to the reception of TBs, when the UE is configured from the Node B with multiple CCs in the DL of a communication system, thereby improving the reception reliability of HARQ-ACK information encoded in the PUSCH, to select a PUSCH among multiple PUSCHs for UCI multiplexing, and to apply HARQ-ACK transmission diversity in the PUSCH.

In accordance with an aspect of the present invention a method is provided for receiving HARQ-ACK bits by a node B in a communication system. The method includes configuring a plurality of cells for a UE, where each of the plurality of cells is associated with one transmission mode; receiving, from the UE, via a PUSCH, encoded concatenated HARQ-ACK bits for the plurality of cells; and decoding encoded concatenated HARQ-ACK bits. HARQ-ACK bits for the plurality of cells are concatenated based on an order of a cell index for each of the plurality of cells, and the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block.

In accordance with another aspect of the present invention an apparatus is provided for receiving HARQ-ACK bits in a communication system. The apparatus includes a controller configured to configure a plurality of cells for a UE, where each of the plurality of cells is associated with one transmission mode; a transceiver configured to receive, from the UE, via a PUSCH, encoded concatenated HARQ-ACK bits; and a decoder configured to decode the encoded concatenated HARQ-ACK bits. HARQ-ACK bits for the plurality of cells are concatenated based on an order of a cell index for each of the plurality of cells, and the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block.

In accordance with another aspect of the present invention a method is provided for transmitting HARQ-ACK bits by a UE in a communication system. The method includes receiving a configuration of a plurality of cells, where each of the plurality of cells is associated with one transmission mode; concatenating HARQ-ACK bits for the plurality of cells based on an order of a cell index for each of the plurality of cells; encoding the concatenated HARQ-ACK bits; and transmitting, to a node B, the encoded concatenated HARQ-ACK bits via a PUSCH. The concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block.

In accordance with another aspect of the present invention an apparatus is provided for transmitting HARQ-ACK bits in a communication system. The apparatus includes a controller configured to concatenate HARQ-ACK bits for a plurality of cells based on an order of a cell index for each of the plurality of cells; an encoder configured to encode the concatenated HARQ-ACK bits; and a transmitter configured to transmit, to a node B, the encoded concatenated HARQ-ACK bits via a PUSCH. The plurality of cells are configured by the node B, where each of the plurality of cells is associated with one transmission mode, and the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
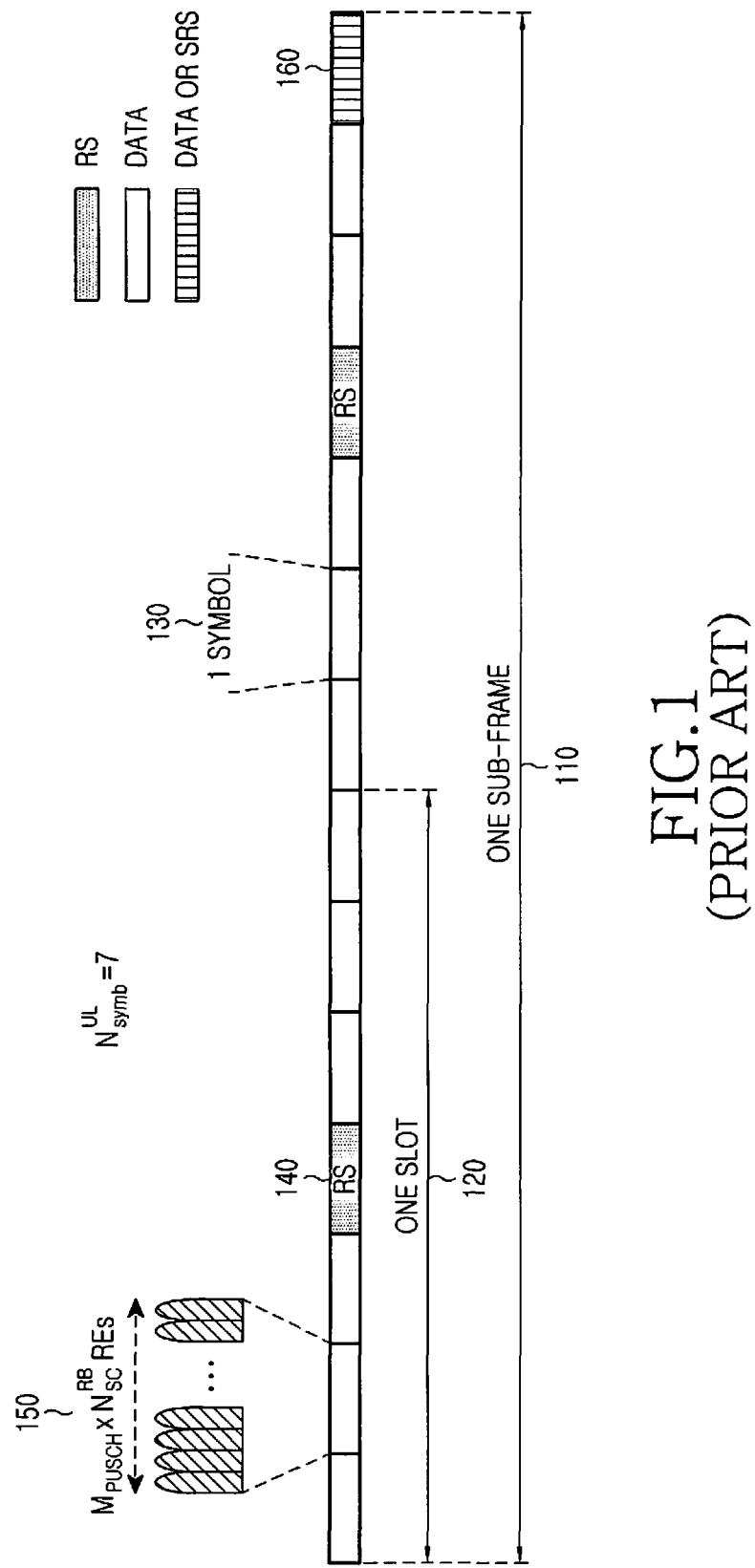
FIG. 1 is a diagram illustrating a conventional PUSCH sub-frame structure.

Various embodiments of the present invention will now be described more fully hereinafter with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to a Frequency Division Duplex (FDD) communication system using DFT-spread OFDM transmission, they also are applicable to a Time Division duplex (TDD) communication system and to all Frequency Division Multiplexing (FDM) transmissions in general and to Single-Carrier Frequency Division Multiple Access (SC-FDMA) and OFDM in particular.

In accordance with an embodiment of the present invention HARQ-ACK multiplexing is performed in a single PUSCH in response to the reception of at least one TB from a UE configured with multiple DL CCs (unless explicitly stated otherwise).

All O>2 HARQ-ACK bits are assumed to be jointly coded using a single coding method instead of having multiple parallel transmissions of 1 or 2 HARQ-ACK bits, for each respective DL CC, in separate resources. It is assumed that the coding of O HARQ-ACK bits uses the (32, O) block code previously described for the CQI/PMI transmission (the basis sequences may or may not be the same as the ones in Table 2). This allows the transmission of up to 10 HARQ-ACK bits (considering only the first 10 basis sequences). When HARQ-ACK spatial domain bundling is used, each respective HARQ-ACK bit corresponds to the reception of 2 TBs (with an ACK being transmitted if both TBs are correctly received and a NACK being transmitted otherwise).

As some Downlink Control Information (DCI) formats which inform a UE of respective PDSCH transmissions in respective DL CCs may be incorrectly received (or missed) by the UE, in accordance with an embodiment of the present invention there are two possible approaches to ensure that a Node B detects a number of HARQ-ACK bits equal to the number of HARQ-ACK bits the UE transmits and that the Node B and the UE have the same understanding for the placement of the HARQ-ACK bits in the respective codeword of the RM code.

In the first approach, a UE uses the (32, O) RM block code and feeds back a number of HARQ-ACK bits determined from the number of its configured DL CCs and the respective configured Transmission Mode (TM). The TM for each DL CC is assigned to the UE through RRC signaling from the Node B and determines whether the UE may receive a maximum of 1 TB or 2 TBs in the DL CC. If the UE is configured in a DL CC a TM supporting 2 TBs, the UE transmits 2 HARQ-ACK bits for that DL CC regardless of the number of TBs (0, 1, or 2) the UE actually receives in the respective DL sub-frame. If the UE is configured a TM supporting 2 TBs in a DL CC, then if the receptive PDSCH conveyed 1 TB (instead of 2 TBs) the UE indicates an incorrect reception for the second TB (NACK) in the respective position of the HARQ-ACK codeword. If the respective PDSCH is not received, the UE indicates incorrect reception for 2 TBs (2 NACKs) in the respective positions of the HARQ-ACK codeword.

If the UE has $M_1$ DL CCs and there are $N_1 \leq M_1$ DL CCs for which the PDSCH may convey 2 TBs (UE configured a TM supporting 2 TBs), the number of HARQ-ACK bits in the PUSCH is computed as $O=2N_1+(M_1-N_1)=M_1+N_1$. If the UE has only $M_1=2$ DL CCs and there are $N_1=0$ DL CCs with configured TM enabling reception of a maximum of 2 TBs, then the UE transmits O=2 HARQ-ACK bits using the previously described (3, 2) simplex code. In all other cases, a UE with at least 2 DL CCs configured, has a minimum number of O=3 HARQ-ACK bits and it uses the (32, O) RM block code to convey them in the PUSCH.

Figure 6:
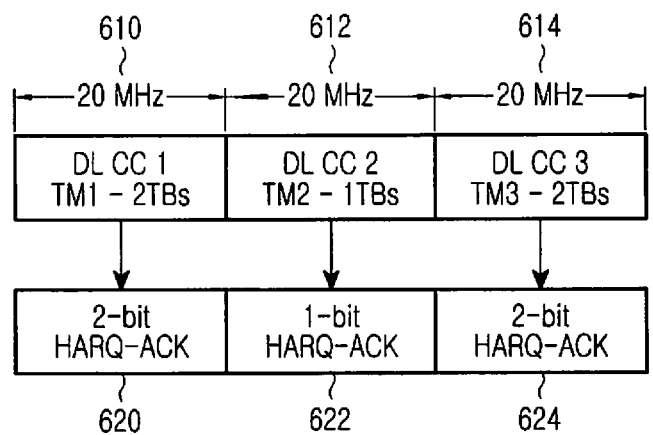
FIG. 6 illustrates the generation of HARQ-ACK acknowledgement bits according to an embodiment of the present invention.

FIG. 6 illustrates the first approach for HARQ-ACK multiplexing in a PUSCH according to an embodiment of the present invention.

Referring to FIG. 6, a UE has 3 DL CCs, DL CC1 610, DL CC2 612, and DL CC3 614. In DL CC1 610 the UE is configured TM1 supporting a maximum of 2 TBs, in DL CC2 612 the UE is configured TM2 supporting a maximum of 1 TB, and in DL CC3 614 the UE is configured TM3 supporting a maximum of 2 TBs. The UE always transmits a 2-bit HARQ-ACK 620 corresponding to DL CC1 610, a 1-bit HARQ-ACK 622 corresponding to DL CC2 612, and a 2-bit HARQ-ACK 624 corresponding to DL CC3 614. In all cases, the HARQ-ACK transmission occurs regardless of whether the UE receives PDSCH in the corresponding DL CC. Therefore, the UE always transmits and the Node B always receives 5 HARQ-ACK bits for HARQ-ACK multiplexing in the PUSCH.

In the second approach, each DCI format scheduling PUSCH transmission includes a Downlink Assignment Indicator (DAI) Information Element (IE). The DAI IE is a bit-map indicating the DL CCs with PDSCH transmission. For example, assuming that a UE can have a maximum of 5 DL CCs, the DAI IE consists of 5 bits. Using the DAI IE, the number of HARQ-ACK bits is not always the maximum one corresponding to the configured DL CCs. Various methods to reduce the number of DAI IE bits may also apply. For example, the UE may assume that it always has PDSCH transmission in a DL CC, in which case the bit-map does not address that DL CC. The number of HARQ-ACK bits transmitted by the UE in the PUSCH depends on the maximum number of TBs the PDSCH may convey in a DL CC indicated by the DAI IE.

If the DAI IE indicates $M_2$ DL CCs (the bit-map has $M_2$ bits with value 1 indicating a DL CC) and, in these $M_2$ DL CC, there are $N_2 \leq M_2$ DL CCs for which the PDSCH may convey 2 TBs, the number of HARQ-ACK bits is $O=2N_2+(M_2-N_2)=M_2+N_2$.

Similar to the first approach, if the DAI IE indicates only $M_2=1$ DL CC or $M_2=2$ DL CCs with both having configured TM associated with the reception of 1 TB ($N_2=0$), then the UE transmits O=1 or O=2 HARQ-ACK bits using the respective one of the two previously described methods (repetition code or (3, 2) simplex code). In all other cases, a UE has a minimum number of O=3 HARQ-ACK bits and, when it conveys them in the PUSCH, it uses the (32, O) RM block code.

Figure 7:
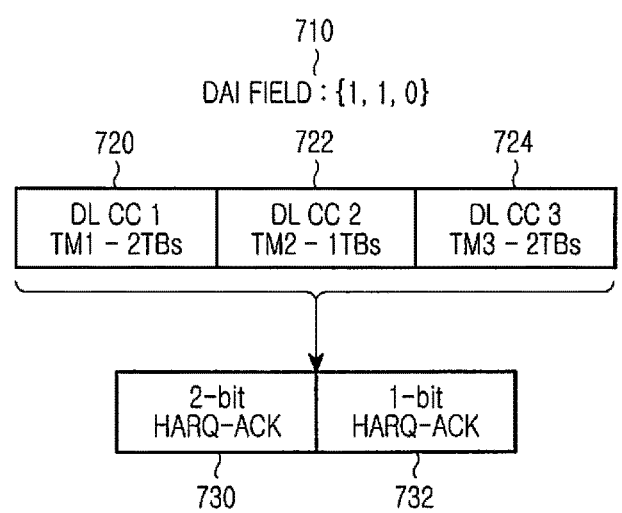
FIG. 7 illustrates HARQ-ACK information bits according to an embodiment of the present invention.

FIG. 7 illustrates HARQ-ACK information bits according to an embodiment of the present invention, i.e., an embodiment of the second approach.

Referring to FIG. 7, a reference UE has 3 DL CCs, DL CC1 720, DL CC2 722, and DL CC3 724. In DL CC1 720 the UE is configured TM1 supporting a maximum of 2 TBs, in DL CC2 722 the UE is configured TM2 supporting a maximum of 1 TB, and in DL CC3 724 the UE is configured TM3 supporting a maximum of 2 TBs. The DAI IE 710 in the DCI format for a PUSCH transmission indicates PDSCH transmission in DL CC1 and DL CC2. The UE transmits 2 HARQ-ACK bits 730 for DL CC1 720 and 1 HARQ-ACK bit 732 for DL CC2 722. This HARQ-ACK transmission occurs regardless of whether the UE actually receives the PDSCH in DL CC1 or DL CC2 (a PDSCH is missed when the respective DL SA is missed).

The ordering of the HARQ-ACK bits in the block code is determined by the ordering of the respective DL CCs. The ordering of the DL CCs can be configured through RRC signaling by the Node B or be implicitly determined, e.g., from the order of carrier frequencies for the DL CCs. That is, the DL CCs may be ordered in ascending carrier frequency.

Once the UE determines the number O of HARQ-ACK bits to transmit, it applies the (32, O) block code as shown in Table 2.

In accordance with an embodiment of the present invention repetitions of the encoded HARQ-ACK bits may be applied in order to achieve the required reliability. For example, for QPSK modulation, the 32 output bits can be mapped to 16 modulated symbols, which are distributed in blocks of 4 REs in the 4 DFT-S-OFDM symbols around the 2 RS per sub-frame. When multiple repetitions of the encoded HARQ-ACK bits are applied, the REs used for HARQ-ACK transmission are in multiples of 16.

Figure 8:
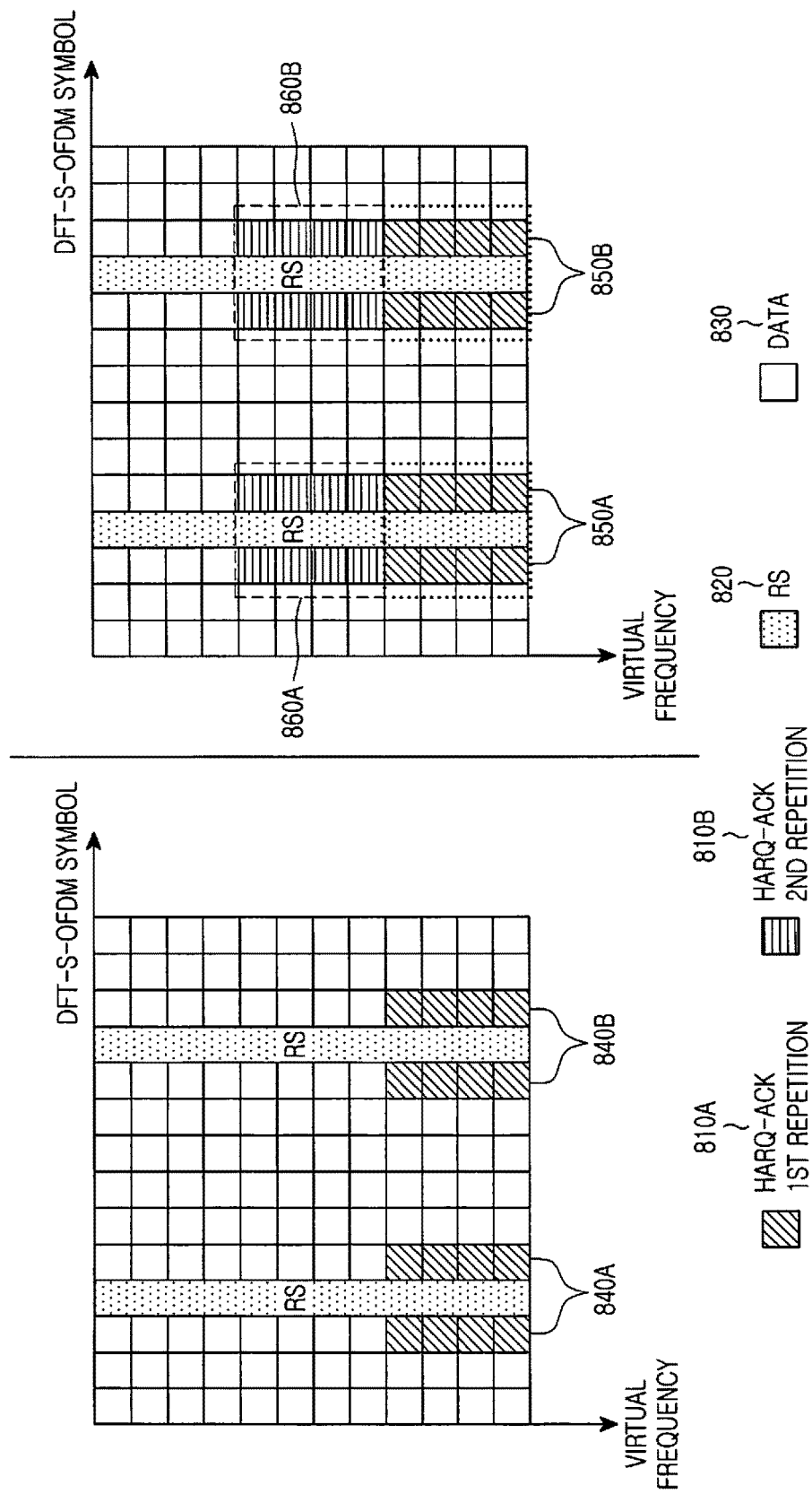
FIG. 8 illustrates transmissions of encoded HARQ-ACK bits from a UE using QPSK modulation with one repetition and with two repetitions of a block code according to an embodiment of the present invention.

FIG. 8 illustrates a transmission of encoded HARQ-ACK bits for QPSK modulation with one repetition and with two repetitions of the (32, O) block code. For simplicity, transmission of other UCI types is not considered.

Referring to FIG. 8, the PUSCH includes HARQ-ACK REs for a first repetition 810A, HARQ-ACK REs for a second repetition 810B, RS REs 820, and data REs 830. For one repetition, the HARQ-ACK REs are mapped around the RS in groups of 4 REs, 840A and 840B. For two repetitions, the HARQ-ACK REs are mapped around the RS in groups of 4 REs, 850A and 850B for the first repetition and again in groups of 4 REs 860A and 860B for the second repetition.

Figure 9:
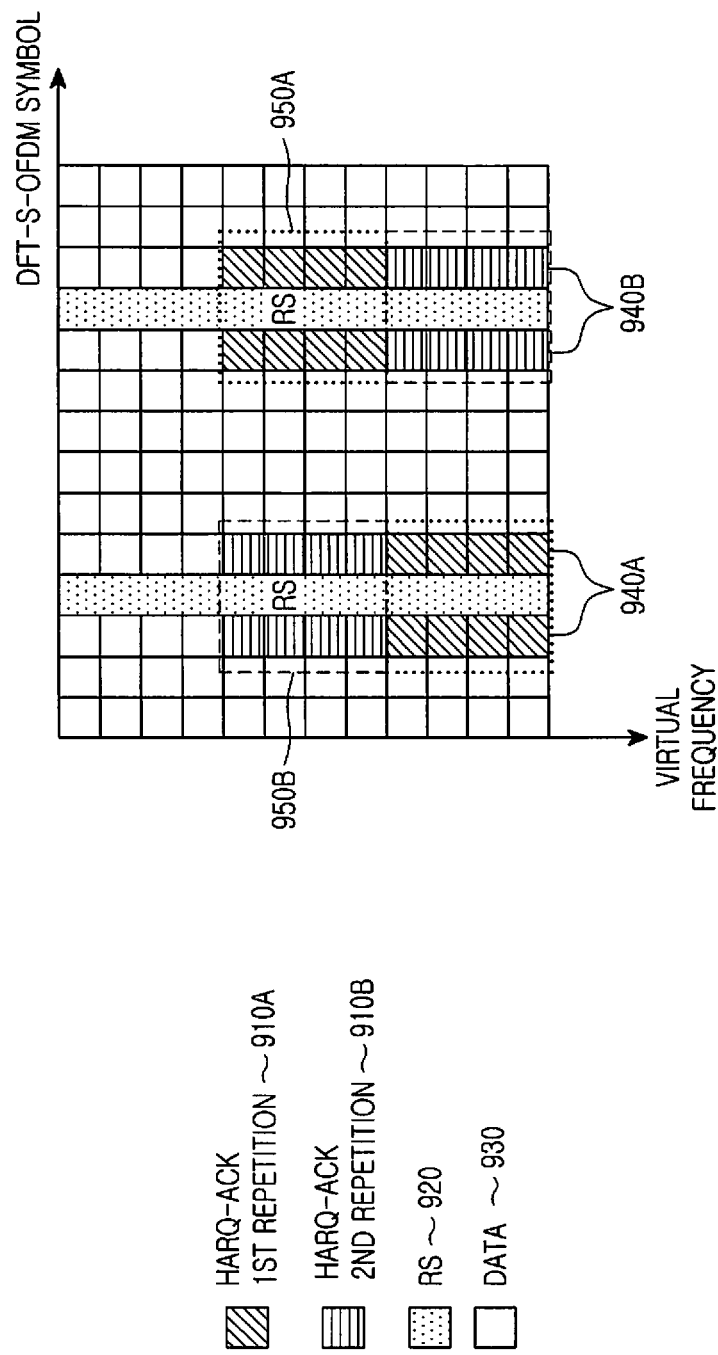
FIG. 9 illustrates using different frequencies for transmission in each sub-frame slot of encoded HARQ-ACK bits from a UE for two repetitions of a block code according to an embodiment of the present invention.

For multiple repetitions, different frequencies can be used for the transmission in each slot in order to enhance the frequency diversity and interference diversity of each repetition, as is illustrated in FIG. 9 for 2 repetitions.

FIG. 9 illustrates using different frequencies for transmission in each sub-frame slot of encoded HARQ-ACK bits from a UE for two repetitions of a block code according to an embodiment of the present invention.

Referring to FIG. 9, the PUSCH sub-frame includes HARQ-ACK REs for a first repetition 910A, HARQ-ACK REs for a second repetition 910B, RS REs 920, and data REs 930. The HARQ-ACK REs are mapped around the RS in groups of 4 REs, where the location of the REs in the first slot for the first repetition 940A and for the second repetition 940B is switched in the second slot for the first repetition 950A and for the second repetition 950B.

For HARQ-ACK transmission in the PUSCH, a UE determines the respective number of coded symbols Q' (nominal coding rate) as shown in Equation (5).

$$Q' = \min\left(\left\lceil \frac{O \cdot \beta_{offset}^{PUSCH}(O)}{Q_m \cdot R} \right\rceil, 4 \cdot M_{sc}^{PUSCH}\right) \quad (5)$$

Because the HARQ-ACK information payload is fixed at O bits, the number of coded symbols Q' determines the nominal coding rate of the HARQ-ACK transmissions, which is inversely proportional to the MCS of the data transmission, as this is determined by $Q_m \cdot R$.

Alternatively, in order to simplify the encoding operation at the UE transmitter and the decoding operation at the Node B receiver and to avoid the puncturing losses associated with the coding rate increase for a block code with shortened length (if $\lceil O \cdot \beta_{offset}^{PUSCH}(O)/(Q_m \cdot R)\rceil < 32$), an integer number of repetitions for the (32, O) block code may only be defined if the nominal coding rate is larger than a predetermined maximum coding rate. Then, the UE determines the number of repetitions R for the encoded UCI (HARQ-ACK or RI) bits as shown in Equation (6).

$$R = \min\left(\left\lceil \frac{O \cdot \beta_{offset}^{PUSCH}(O)}{R \cdot 32} \right\rceil, \frac{4 \cdot M_{sc}^{PUSCH} \cdot Q_m}{32}\right) = \\ \min\left(\left\lceil \frac{O \cdot \beta_{offset}^{PUSCH}(O)}{32 \cdot R} \right\rceil, \frac{M_{sc}^{PUSCH} \cdot Q_m}{8}\right) \quad (6)$$

In Equation (6), $\beta_{offset}^{PUSCH}(O)$ depends on a number of transmitted HARQ-ACK bits. It is assumed that the maximum number of $4 \cdot M_{sc}^{PUSCH}$ REs available for HARQ-ACK multiplexing in the PUSCH is not reached. Different $\beta_{offset}^{PUSCH}(O)$ values may be defined for different O values or a few $\beta_{offset}^{PUSCH}(O)$ values may be defined for a set of O values. As O is predetermined through RRC configuration, for example $O=M_1+N_1$, $\beta_{offset}^{PUSCH}(O)$ can also be predetermined through RRC configuration and $\beta_{offset}^{PUSCH}(O)=\beta_{offset}^{PUSCH}$.

For HARQ-ACK transmission, as a rate of a block code depends on a number of transmitted HARQ-ACK bits, even if a UE always transmits a maximum number of HARQ-ACK bits corresponding to all DL CCs, differences in reception reliability due to differences in a block code rate are reflected by the dependence of $\beta_{offset}^{HARQ-ACK}(O)$ on the number of transmitted HARQ-ACK bits. Unlike the conventional transmission of 1 HARQ-ACK bit using repetition coding, the dependence is not linear (that is, $\beta_{offset}^{HARQ-ACK}(O) \neq O \cdot \beta_{offset}^{HARQ-ACK}(1)$), as the differences in reception reliability due to changes in the coding rate are not linear. For simplicity, different consecutive values for O may map to the same $\beta_{offset}^{HARQ-ACK}(O)$ value.

Figure 10:
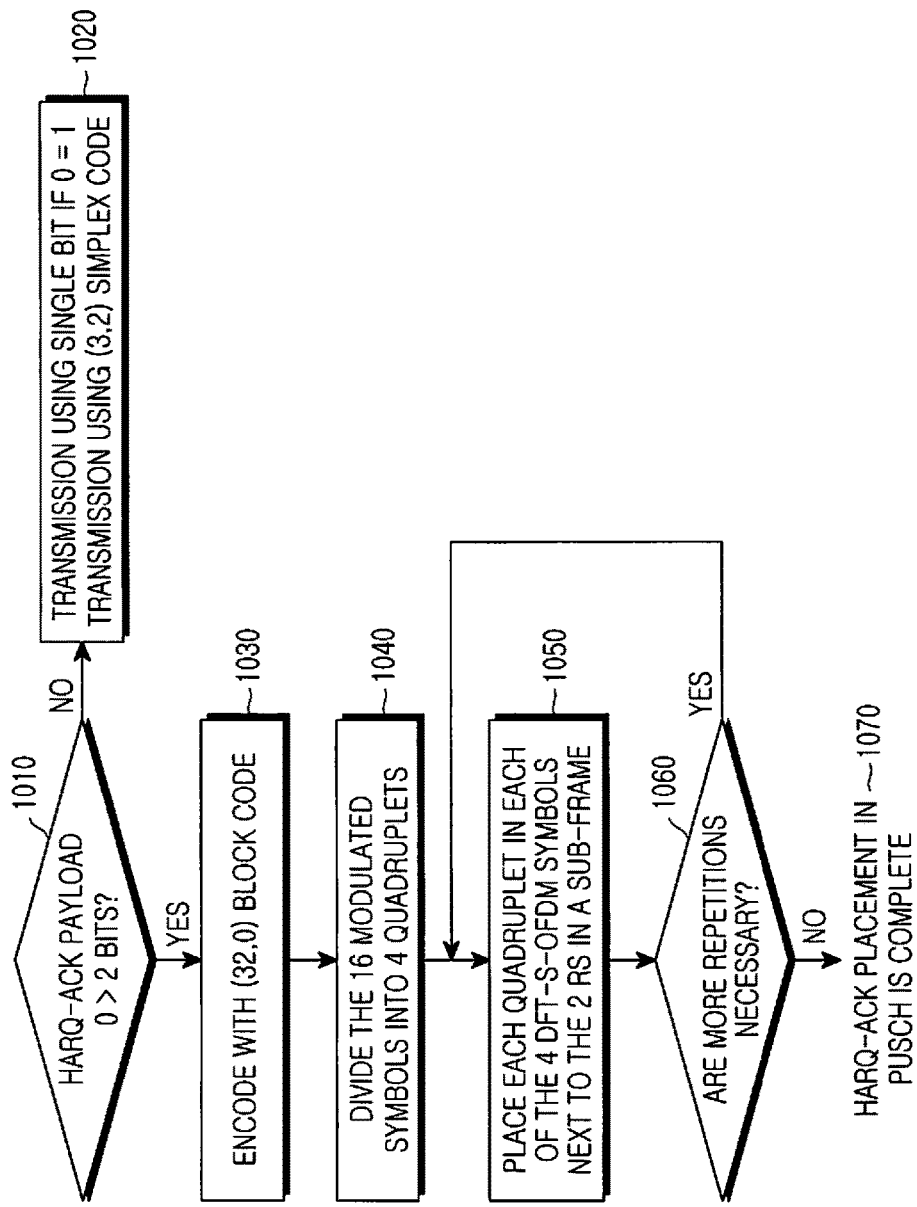
FIG. 10 is a flowchart illustrating a method of multiplexing different HARQ-ACK (or RI) payloads in a PUSCH according to an embodiment of the present invention.

FIG. 10 is a flowchart illustrating a method of multiplexing different HARQ-ACK (or RI) payloads (number of information bits) in a PUSCH according to an embodiment of the present invention. Specifically, FIG. 10 illustrates UE transmitter and Node B receiver functionalities when multiplexing different HARQ-ACK payloads in a PUSCH.

Referring to FIG. 10, in step 1010 it is determined whether the number of HARQ-ACK bits is O>2. If the number of HARQ-ACK bits is not O>2, the respective conventional method (repetition code or simplex code) is used for the HARQ-ACK transmission in step 1020. However, if the number of HARQ-ACK bits is O>2, the HARQ-ACK bits are encoded using the (32, O) RM block code in step 1030.

In step 1040, assuming 2 HARQ-ACK bits per modulated symbol (QPSK modulation), the 32 encoded HARQ-ACK bits (code rate is assumed to be decreased from its nominal value to accommodate at least 1 repetition of 32 coded bits) are divided into 4 quadruplets, which are then placed in 4 REs at the 4 DFT-S-OFDM symbols next to the 2 RS symbols in the sub-frame of PUSCH transmission in step 1050. If the conditions determining the number of HARQ-ACK coded symbols indicate additional repetitions in step 1060, step 1050 is repeated using additional REs. However, when there are no additional repetitions in step 1060, the process for placing the HARQ-ACK bits in the PUSCH is completed in step 1070.

After the coding and resource allocation of the HARQ-ACK bits is applied as described in FIG. 10, apparatuses, such as those described above in relation to FIG. 2 and FIG. 3, may be used for the transmission and reception of the HARQ-ACK bits. Accordingly, a repetitive description will not be provided herein.

In accordance with another embodiment of the present invention, a single PUSCH is selected from among multiple PUSCH during the same sub-frame in different UL CCs, for UCI multiplexing. Considering S PUSCH transmissions without spatial multiplexing with respective MCS of {MCS (1), MCS(2), . . . , MCS(S)}, a first approach considers that UE selects the PUSCH transmission with the largest MCS for UCI multiplexing. Therefore, the UE transmits UCI in UL CC s obtained as $$s = \arg\max_{j=1,\ldots,S} \{MCS(j)\}.$$

Figure 11:
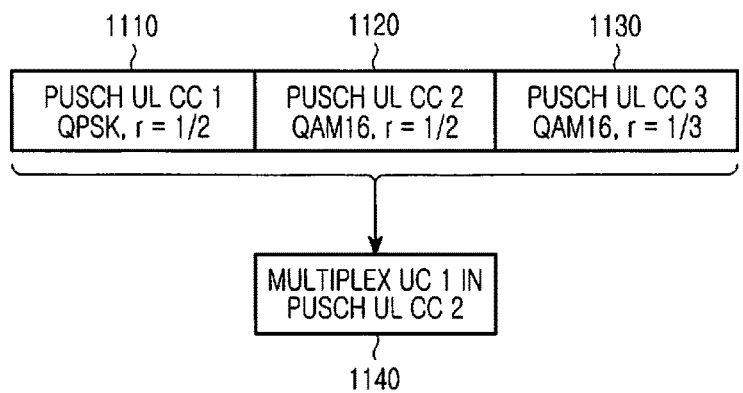
FIG. 11 illustrates a selection of a single PUSCH, among multiple PUSCH, for UCI multiplexing according to a metric quantified by the PUSCH MCS, according to an embodiment of the present invention.

FIG. 11 illustrates a selection of a single PUSCH from among multiple PUSCH, for UCI multiplexing according to an embodiment of the present invention.

Referring to FIG. 11, a reference UE has 3 PUSCH transmissions in a sub-frame in 3 respective UL CCs, UL CC1 with QPSK modulation and code rate of r=1/2 1110, UL CC2 with QAM16 modulation and code rate of r=1/2 1120, and UL CC3 with QAM16 modulation and code rate of r=1/3 1130. As the PUSCH transmission in UL CC2 has the largest MCS (largest spectral efficiency), the UE multiplexes UCI in the PUSCH transmission in UL CC2 1140.

The advantage of selecting only a single PUSCH for UCI multiplexing is that it provides a single solution regardless of the number of PUSCH transmissions a UE may have in a single sub-frame and it fits naturally with the joint coding of all HARQ-ACK bits. By choosing the PUSCH transmission with the largest MCS, the best reliability for the UCI transmission is achieved, as typically the larger the MCS is, the better the link quality is.

Further, choosing a single PUSCH minimizes the impact of error cases that may occur if the UE misses DCI formats scheduling PUSCH transmissions. When a Node B and a UE have different understandings of the selected PUSCH with the highest MCS, e.g., because the UE missed the DCI format scheduling the PUSCH with the largest MCS, the Node B can detect an absence of such a transmission and can determine that UCI is included in the first PUSCH transmission with the largest MCS the Node B detects. If multiple PUSCH transmissions have the same, highest MCS, the selected PUSCH transmission may be in a pre-determined UL CC such as, for example, in the UL CC with the smaller index, as these UL CC indexes are configured to the UE by the Node B.

In accordance with another embodiment of the invention, a UE selects for, UCI multiplexing, a PUSCH transmission minimizing a relative amount of data REs that are to be replaced by UCI REs. If the UE has S PUSCH transmissions in a given sub-frame and the respective number of REs required for UCI multiplexing in the PUSCH s is O(s), s=1, . . . , S, then the UE can select for UCI multiplexing the PUSCH minimizing the utility ratio U(s) as shown in Equation (7).

$$U(s) = \frac{O(s)}{N_{symb}^{PUSCH}(s) \cdot M_{sc}^{PUSCH}(s)}, s = 1, \ldots, S \quad (7)$$

In Equation (7), $M_{sc}^{PUSCH}(s) = M_{PUSCH}(s) \cdot N_{sc}^{RB}$ is a number of REs assigned to PUSCH transmission s and $N_{symb}^{PUSCH}(s) = 2 \cdot (N_{symb}^{UL} - 1) - N_{SRS}(s)$ is a number of symbols in PUSCH transmission s available for data transmission (with $N_{SRS}(s)=1$, if a last sub-frame symbol is used for SRS transmission and $N_{SRS}(s)=0$ otherwise). The benefit of this approach is that the impact of data puncturing or rate matching, due to UCI multiplexing, on the data reception reliability is minimized. For example, for the same target BLER, $Q_m$ per PUSCH transmission, if a UE has a first PUSCH transmission over 20 RBs with data code rate of 1/2 and a second PUSCH transmission over 5 RBs with data code rate of 5/8, the selection of the first PUSCH transmission will lead to a lower number of relative REs for UCI multiplexing, although the selection of the second PUSCH transmission (highest MCS) minimizes the absolute number of REs required for UCI multiplexing. The above may be further conditioned on the required UCI resources being available (for example, on not reaching the maximum number of REs around the DM RS symbols for the HARQ-ACK transmission).

In accordance with another embodiment of the invention, a Node B can dynamically select the PUSCH for UCI multiplexing by including a 1-bit IE in the DCI format scheduling each PUSCH transmission to indicate whether or not a UCI should be multiplexed in a respective PUSCH. When the DCI format indicating the PUSCH for UCI multiplexing is missed by the UE, the UE can revert to choosing the PUSCH with a largest MCS or the one minimizing the relative UCI overhead. The same applies if there is no DCI format associated with the PUSCH transmission such as, for example, for synchronous non-adaptive HARQ retransmissions or semi-persistent PUSCH transmissions.

Figure 12:
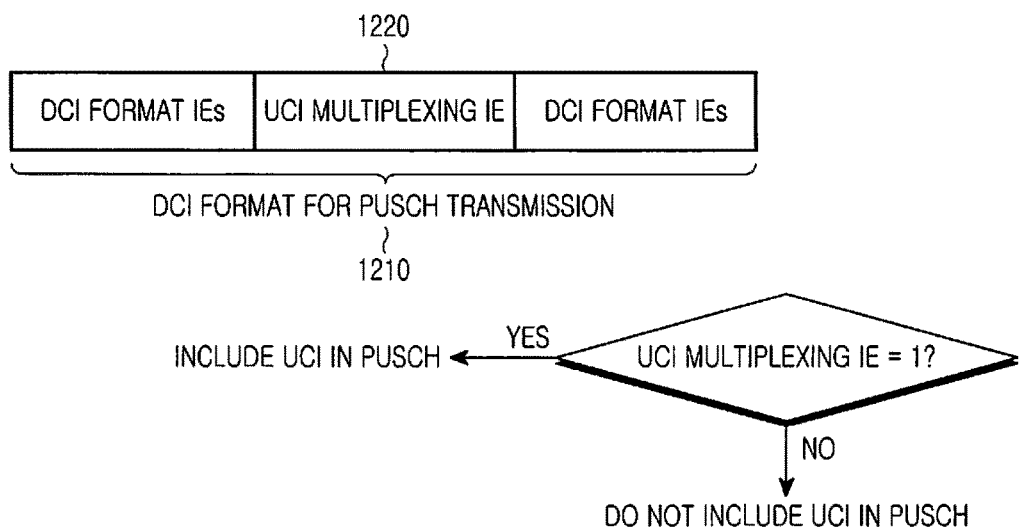
FIG. 12 illustrates an inclusion of a "UCI_Multiplexing" IE in a DCI format scheduling a PUSCH transmission, according to an embodiment of the present invention.

FIG. 12 illustrates an inclusion of a "UCI_Multiplexing" IE in a DCI format scheduling a PUSCH transmission.

Referring to FIG. 12, for the PUSCH transmission 1210, the "UCI_Multiplexing" IE 1220 in the associated DCI format indicates whether the UE should include its UCI transmission in the PUSCH 1230 or not 1240.

Instead of explicitly introducing an IE to indicate whether a UE should include UCI in its PUSCH transmission, an existing IE in the DCI format scheduling a PUSCH transmission may be used to implicitly perform that functionality. For example, the DCI format is assumed to contain a Cyclic Shift Indicator (C SI) IE to inform the UE of the Cyclic Shift (CS) to apply to the RS transmission in the PUSCH. A CSI value can be reserved so that when it is signaled in the DCI format, it also indicates UCI inclusion in the PUSCH. The values of other existing DCI format IEs or their combination may also be used for the same purpose. The process in FIG. 12 can again apply (additional illustration is omitted for brevity) with the exception that instead of examining the value of a "UCI Multiplexing" IE, the UE examines whether the existing CSI IE has a predetermined value and if so, it includes the UCI in the PUSCH transmission.

In accordance with another embodiment of the invention, in the absence of any PUSCH transmission, the same UL CC (UL Primary CC) is always used by the UE to transmit UCI in the PUCCH. The UL Primary CC (UL PCC) can also be the default UL CC for multiplexing UCI in the PUSCH, when a PUSCH transmission exists in the UL PCC. Otherwise, the UE can revert to other means for choosing the PUSCH (such as using one of the previously described metrics or using a predetermined order based on the UL CC indexes as previously described). A benefit of using the PUSCH transmission (when it exists) in the UL PCC to convey UCI occurs if a UE is configured to transmit some UCI (such as CQI/PMI) in the PUCCH while some other UCI (such as HARQ-ACK) in the PUSCH. By using transmissions in the same UL CC (the UL PCC) to convey the UCI in the PUSCH and the PUCCH, the impact of intermodulation products and of the possible requirement for power reduction on the UCI transmission is minimized.

In accordance with an embodiment of the present invention, TxD is applied to a UCI transmission in a PUSCH.

Figure 13:
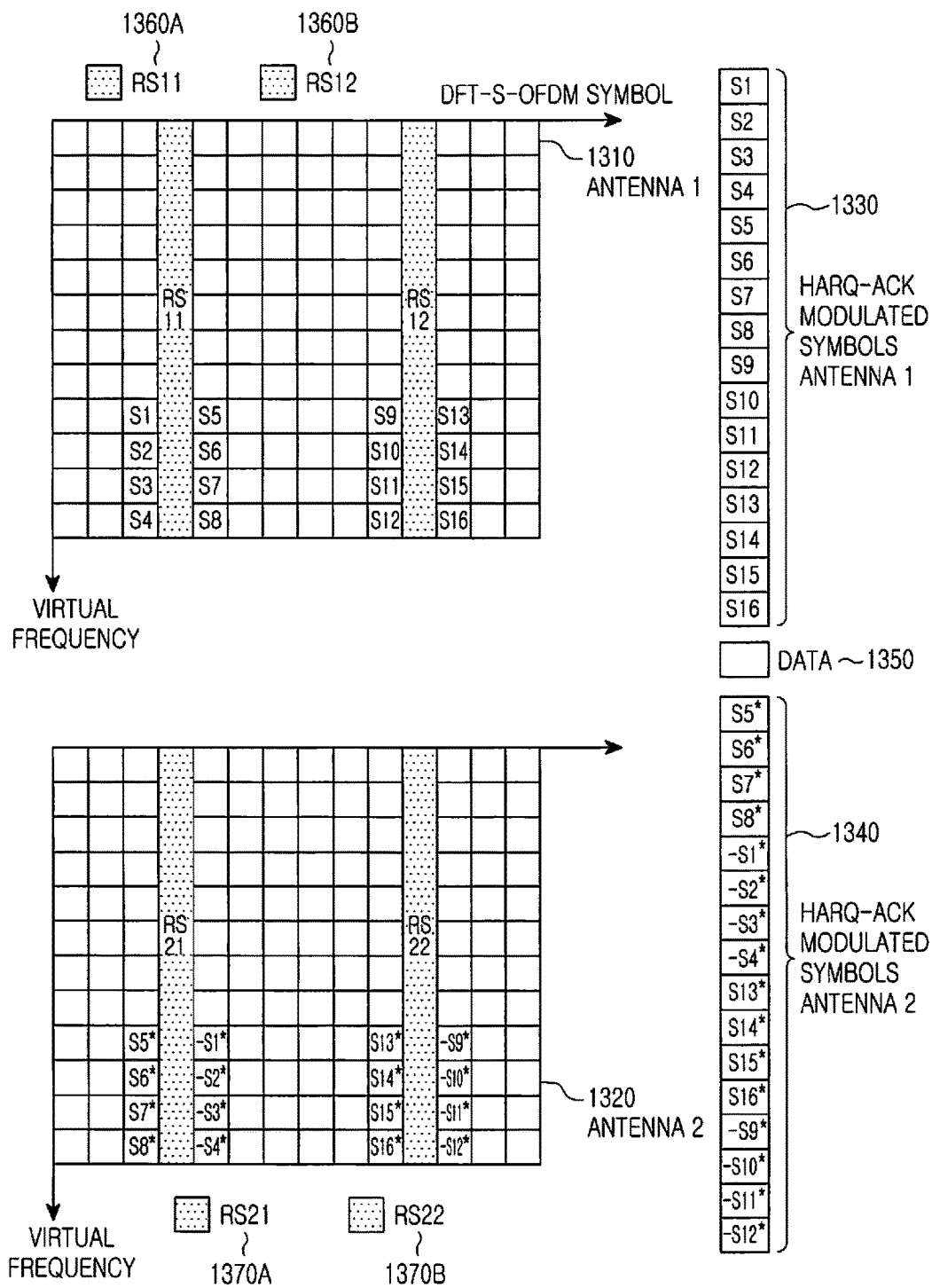
FIG. 13 is a diagram illustrates STBC of HARQ-ACK transmission in a PUSCH according to an embodiment of the present invention.

FIG. 13 illustrates STBC to a HARQ-ACK transmission in a PUSCH according to an embodiment of the present invention.

Referring to FIG. 13, in general, it is assumed that the number of HARQ-ACK REs is even and in particular, assuming QPSK-type modulation and the (32, O) block code, the number of HARQ-ACK REs is a multiple of 16 (=32/2). The first UE antenna transmits the structure 1310 and the second UE antenna transmits the structure 1320. The UE applies STBC for the transmission of the modulated HARQ-ACK symbols 1330 from the first antenna and applies STBC for the transmission of the modulated HARQ-ACK symbols 1340 from the second antenna. The UE may or may not apply STBC for the transmission of the information data 1350.

The RS transmission in each of the two slots from the first antenna, RS11 1360A and RS12 1360B, is orthogonal to the RS transmission in each of the two slots from the second antenna, RS21 1370A and RS22 1370B. For example, RS11 1360A and RS21 1370A may use different CS. RS12 1360B and RS22 1370B may also use different CS. The UE may determine the CS for RS11 1360A from the CSI IE in the DCI format or through RRC signaling from the Node B. The CS for RS21 1370A can be implicitly determined from the CS for RS11 1360A (for example, the CS for RS21 1370A may be the one with the largest distance from the CS for RS11).

Figure 2:
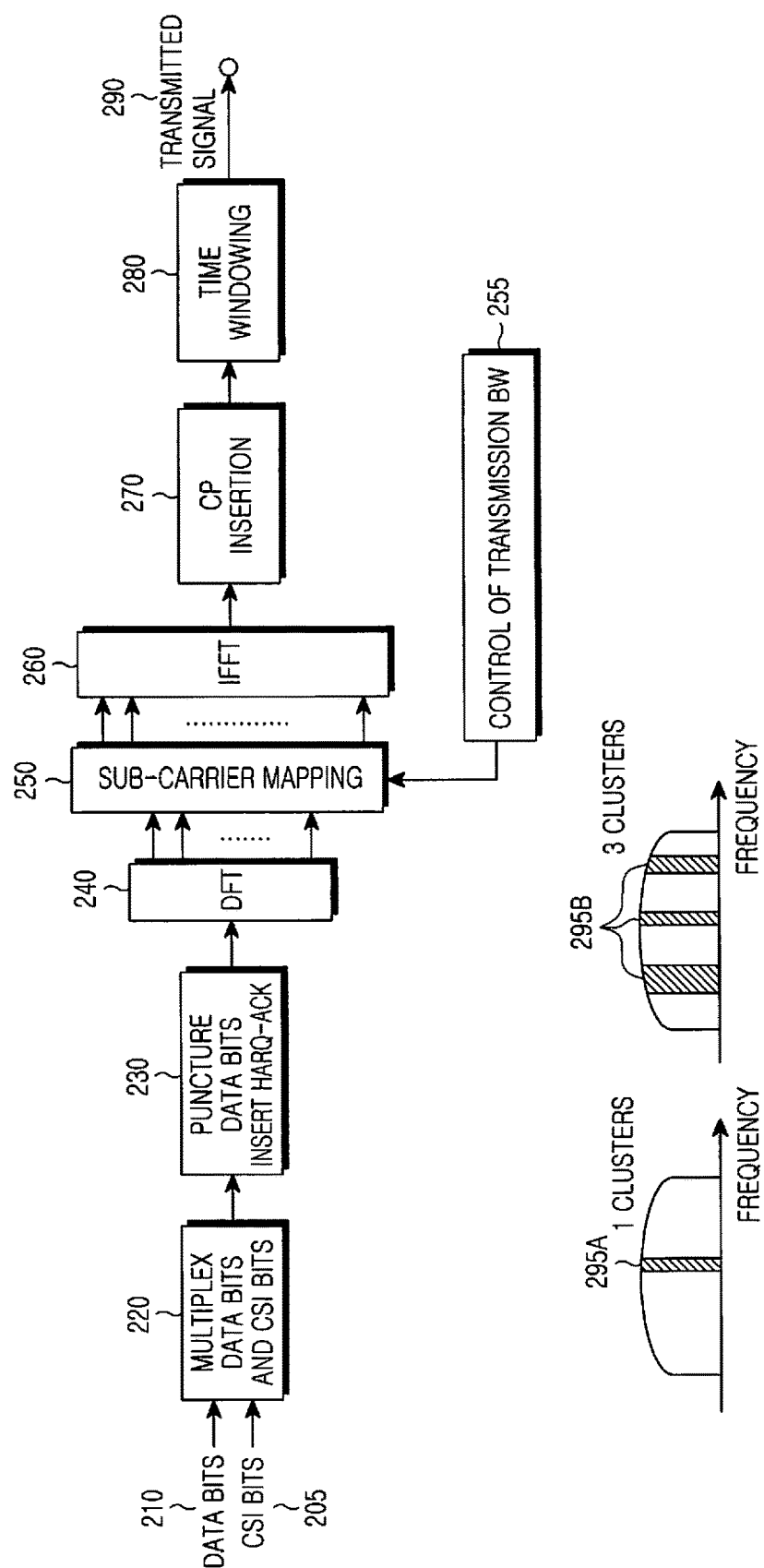
FIG. 2 is a block diagram illustrating a conventional transmitter for transmitting data, CSI, and HARQ-ACK signals in a PUSCH.

The UE apparatus for the transmission from the first antenna is as illustrated in FIG. 2. The apparatus for the transmission from the second antenna is also as described in FIG. 2 with an exception that the modulated HARQ-ACK symbols are as in FIG. 13.

Figure 3:
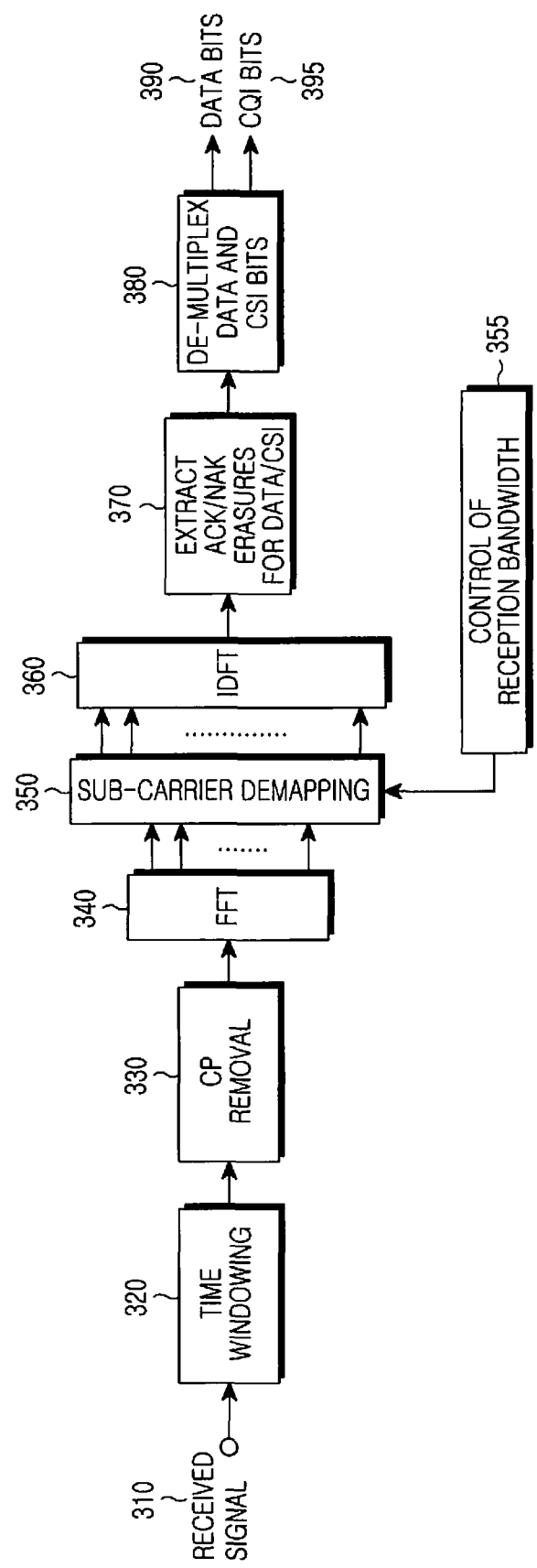
FIG. 3 is a block diagram illustrating a conventional receiver for receiving data, CSI, and HARQ-ACK signals in the PUSCH.
Figure 4:
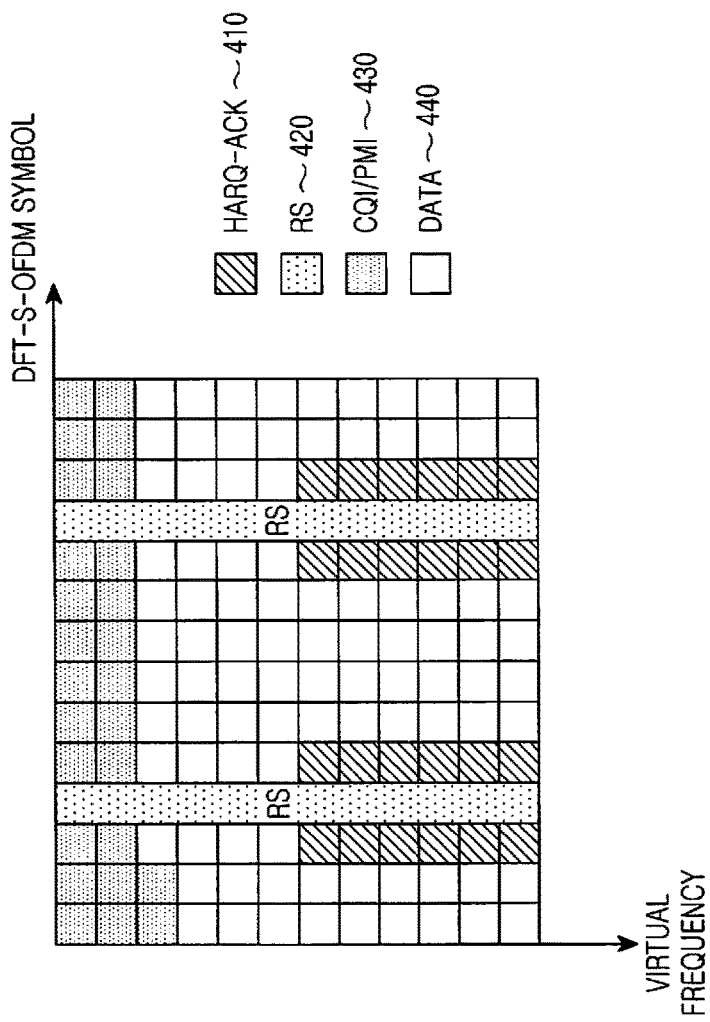
FIG. 4 is a diagram illustrating conventional multiplexing of UCI and data in a PUSCH.
Figure 5:
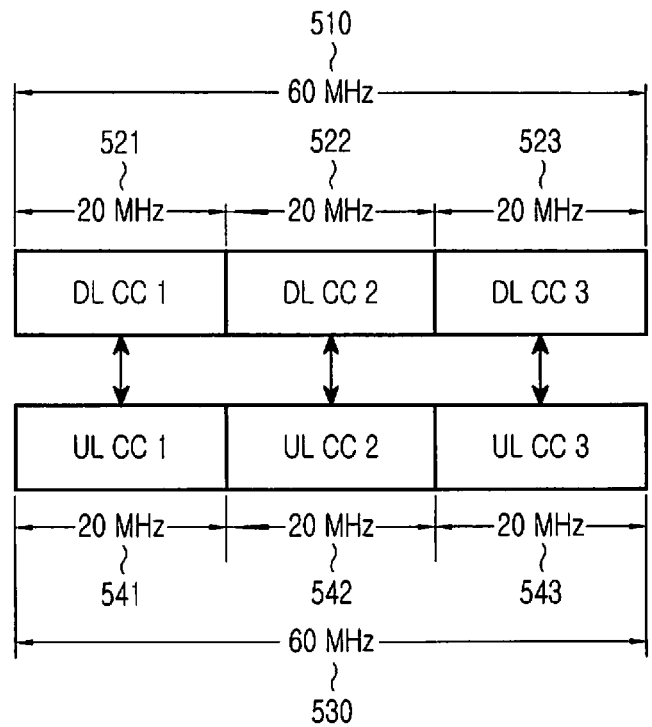
FIG. 5 is a diagram illustrating the concept of conventional carrier aggregation.

The Node B receiver apparatus is as illustrated in FIG. 3 (for the HARQ-ACK bits) with an exception of an STBC reception processing applies as previously described. Therefore, for a reference Node B receiver antenna, if $h_j$ is the channel estimate for the signal transmitted from the $j^{th}$ UE antenna, j=1, 2, and $y_k$ is the signal received in the $k^{th}$ DFT-S-OFDM symbol, k=1, 2, the decision for a pair of HARQ-ACK symbols $[\hat{d}_k, \hat{d}_{k+1}]$ (prior to decoding) is according to $[\hat{d}_k, \hat{d}^*_{k+1}]^T = H^H [y_k, y^*_{k+1}]^T$ where $[\ ]^T$ denotes the transpose of a vector and $$H^H = \begin{bmatrix} h_1^* & -h_2 \\ h_2^* & h_1 \end{bmatrix} / (|h_1|^2 + |h_2|^2).$$

STBC TxD may or may not apply to other UCI types or to the data information. For example, STBC TxD may apply for the RI as for the HARQ-ACK because RI is always transmitted in an even number of DFT-S-OFDM symbols. However, STBC TxD may not apply for the CQI or for the data information, which, because of a potential SRS transmission, cannot be generally ensured to exist in an even number of DFT-S-OFDM symbols.

The number of resources (coded symbols) used for the transmission of a UCI type in the PUSCH may also depend on the use of TxD. For example, because TxD typically improves the reception reliability of the respective information, fewer resources are required to meet the required reliability for the UCI type. For the determination of the UCI resources in the PUSCH when a particular TxD method, such as STBC, is applied to the UCI transmission, a different set of $\beta_{offset}^{PUSCH}$ values for the corresponding UCI type can be applied. This set $\beta_{offset}^{PUSCH}$ values can be either explicitly defined, as for the case of no TxD, or can be implicitly derived from the set $\beta_{offset}^{PUSCH}$ values without TxD. For example, for implicit derivation, the set of $\beta_{offset}^{PUSCH}$ values with TxD may be determined by scaling the set of values without TxD by ⅔. Alternatively, the Node B may simple configure a different $\beta_{offset}^{PUSCH}$ value when it configures TxD for the transmission of a UCI type.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for receiving hybrid automatic repeat request-acknowledgement (HARQ-ACK) bits by a node B in a communication system, the method comprising steps of:
    configuring a plurality of cells for a user equipment (UE), where each of the plurality of cells is associated with one transmission mode;
    receiving, from the UE, on a physical uplink shared channel (PUSCH), encoded concatenated HARQ-ACK bits for the plurality of cells; and
    decoding encoded concatenated HARQ-ACK bits,
    wherein HARQ-ACK bits for the plurality of cells are concatenated based on an order of a cell index for each of the plurality of cells,
    wherein the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block, and
    wherein the encoded concatenated HARQ-ACK bits are decoded based on a (32, O) block code, if a number of the concatenated HARQ-ACK bits is greater than or equal to 3.

2. The method of claim 1, further comprising receiving a first type of uplink control information (UCI) on the PUSCH of a first cell, and receiving a second type of UCI on a physical uplink control channel (PUCCH) of the first cell, if different types of UCI exist.

3. The method of claim 1, wherein the PUSCH is associated with a first cell, if a PUSCH transmission exists in the first cell.

4. The method of claim 3, wherein the PUSCH is associated with a cell having a smallest cell index, if the PUSCH transmission does not exist in the first cell.

5. An apparatus for receiving hybrid automatic repeat request-acknowledgement (HARQ-ACK) bits in a communication system, the apparatus comprising:
a controller configured to configure a plurality of cells for a user equipment (UE), where each of the plurality of cells is associated with one transmission mode;
a transceiver configured to receive, from the UE, on a physical uplink shared channel (PUSCH), encoded concatenated HARQ-ACK bits; and
a decoder configured to decode the encoded concatenated HARQ-ACK bits,
wherein HARQ-ACK bits for the plurality of cells are concatenated based on an order of a cell index for each of the plurality of cells,
wherein the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block, and
wherein the decoder is configured to decode the encoded concatenated HARQ-ACK bits based on a (32, O) block code, if a number of the concatenated HARQ-ACK bits is greater than or equal to 3.

6. The apparatus of claim 5, wherein the transceiver is further configured to receive a first type of uplink control information (UCI) on the PUSCH of a first cell, and receive a second type of UCI on a physical uplink control channel (PUCCH) of the first cell, if different types of UCI exist.

7. The apparatus of claim 5, wherein the PUSCH is associated with a first cell, if a PUSCH transmission exists in the first cell.

8. The apparatus of claim 7, wherein the PUSCH is associated with a cell having a smallest cell index, if the PUSCH transmission does not exist in the first cell.

9. A method for transmitting hybrid automatic repeat request-acknowledgement (HARQ-ACK) bits by a user equipment (UE) in a communication system, the method comprising steps of:
receiving a configuration of a plurality of cells, where each of the plurality of cells is associated with one transmission mode;
concatenating HARQ-ACK bits for the plurality of cells based on an order of a cell index for each of the plurality of cells;
encoding the concatenated HARQ-ACK bits; and
transmitting, to a node B, the encoded concatenated HARQ-ACK bits on a physical uplink shared channel (PUSCH),
wherein the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block, and
wherein the concatenated HARQ-ACK bits are encoded by a (32, O) block code, if a number of the concatenated HARQ-ACK bits is greater than or equal to 3.

10. The method of claim 9, further comprising transmitting a first type of uplink control information (UCI) on the PUSCH of a first cell, and transmitting a second type of UCI on a physical uplink control channel (PUCCH) of the first cell, if different types of UCI exist.

11. The method of claim 9, wherein the PUSCH is associated with a first cell, if a PUSCH transmission exists in the first cell.

12. The method of claim 11, wherein the PUSCH is associated with a cell having a smallest cell index, if the PUSCH transmission does not exist in the first cell.

13. An apparatus for transmitting hybrid automatic repeat request-acknowledgement (HARQ-ACK) bits in a communication system, the apparatus comprising:
a controller configured to concatenate HARQ-ACK bits for a plurality of cells based on an order of a cell index for each of the plurality of cells;
an encoder configured to encode the concatenated HARQ-ACK bits; and
a transmitter configured to transmit, to a node B, the encoded concatenated HARQ-ACK bits on a physical uplink shared channel (PUSCH),
wherein the plurality of cells are configured by the node B, where each of the plurality of cells is associated with one transmission mode,
wherein the concatenated HARQ-ACK bits include 2 HARQ-ACK bits for a cell associated with a transmission mode supporting up to 2 transport blocks and 1 HARQ-ACK bit for a cell associated with a transmission mode supporting up to 1 transport block, and
wherein the encoder is configured to encode the concatenated HARQ-ACK bits by a (32, O) block code, if a number of the concatenated HARQ-ACK is greater than or equal to 3.

14. The apparatus of claim 13, wherein the transmitter is further configured to transmit a first type of uplink control information (UCI) on the PUSCH of a first cell, and transmit a second type of UCI on a physical uplink control channel (PUCCH) of the first cell, if different types of UCI exist.

15. The apparatus of claim 13, wherein the PUSCH is associated with a first cell, if a PUSCH transmission exists in the first cell.

16. The apparatus of claim 15, wherein the PUSCH is associated with a cell having a smallest cell index, if the PUSCH transmission does not exist in the first cell.

* * * * *